United States Patent [19]

Terabayashi et al.

[11] 4,236,141
[45] Nov. 25, 1980

[54] AUTOMATIC FASTENING AND ALARMING CIRCUIT FOR A VEHICLE SEAT BELT

[75] Inventors: Gosaku Terabayashi, Toyota; Tasuku Nakano, Gifu; Tadanao Hamamoto, Nagoya, all of Japan

[73] Assignees: Toyota Jidosha Kogyo Kabushiki Kaisha; Kabushiki Kaisha Tokai Rika Denki Seisakusho, both of Aichi, Japan

[21] Appl. No.: 4,615

[22] Filed: Jan. 18, 1979

[30] Foreign Application Priority Data

May 15, 1978 [JP] Japan .............................. 53/64779[U]

[51] Int. Cl.³ .......................................... B60R 21/10
[52] U.S. Cl. .................................. 340/52 E; 180/268; 280/802; 307/10 SB
[58] Field of Search .......................... 340/52 E, 52 R; 307/10 SB; 180/82 C, 268, 286; 280/802

[56] References Cited

U.S. PATENT DOCUMENTS

| | | | |
|---|---|---|---|
| 3,757,293 | 9/1973 | Peterson | 340/52 E |
| 3,815,086 | 6/1974 | Minton et al. | 340/52 E |
| 3,906,441 | 9/1975 | Andersen et al. | 340/52 E |
| 3,907,059 | 9/1975 | Takada et al. | 180/82 C |
| 3,915,254 | 10/1975 | Nagano et al. | 180/82 C |
| 3,985,193 | 10/1976 | Akiyama et al. | 340/52 R X |

Primary Examiner—John W. Caldwell, Sr.
Assistant Examiner—Joseph E. Nowicki
Attorney, Agent, or Firm—Koda and Androlia

[57] ABSTRACT

An automatic mounting and alarming circuit for a seat belt of a vehicle capable of automatically fastening the seat belt to a rider of the vehicle upon sitting on the seat, as well as warning the rider of a state where the seat belt is not or can not be fastened. The automatic fastening and alarming circuit includes a seat switch for detecting the sitting of the rider on the seat, a door switch for detecting the opening and closure of a door, an automatic fastening control circuit for supplying a releasing signal to an electromagnetic means to unlatch the retained seat belt upon judging the sitting state of the rider by detection signals delivered from both of the switches, a fastening detection switch for detecting the suitably fastened state of the seat belt to the rider and an alarming circuit for generating alarm information to the rider upon detection of the not-fastened state of the seat belt by detection signals delivered from the seat switch and the fastening detection switch. The automatic fastening and alarming circuit further includes a vehicle speed detection circuit having a hysterisis characteristic which generates alarm information to the rider when the vehicle speed exceeds a predetermined value with the seat belt not being fastened.

7 Claims, 1 Drawing Figure

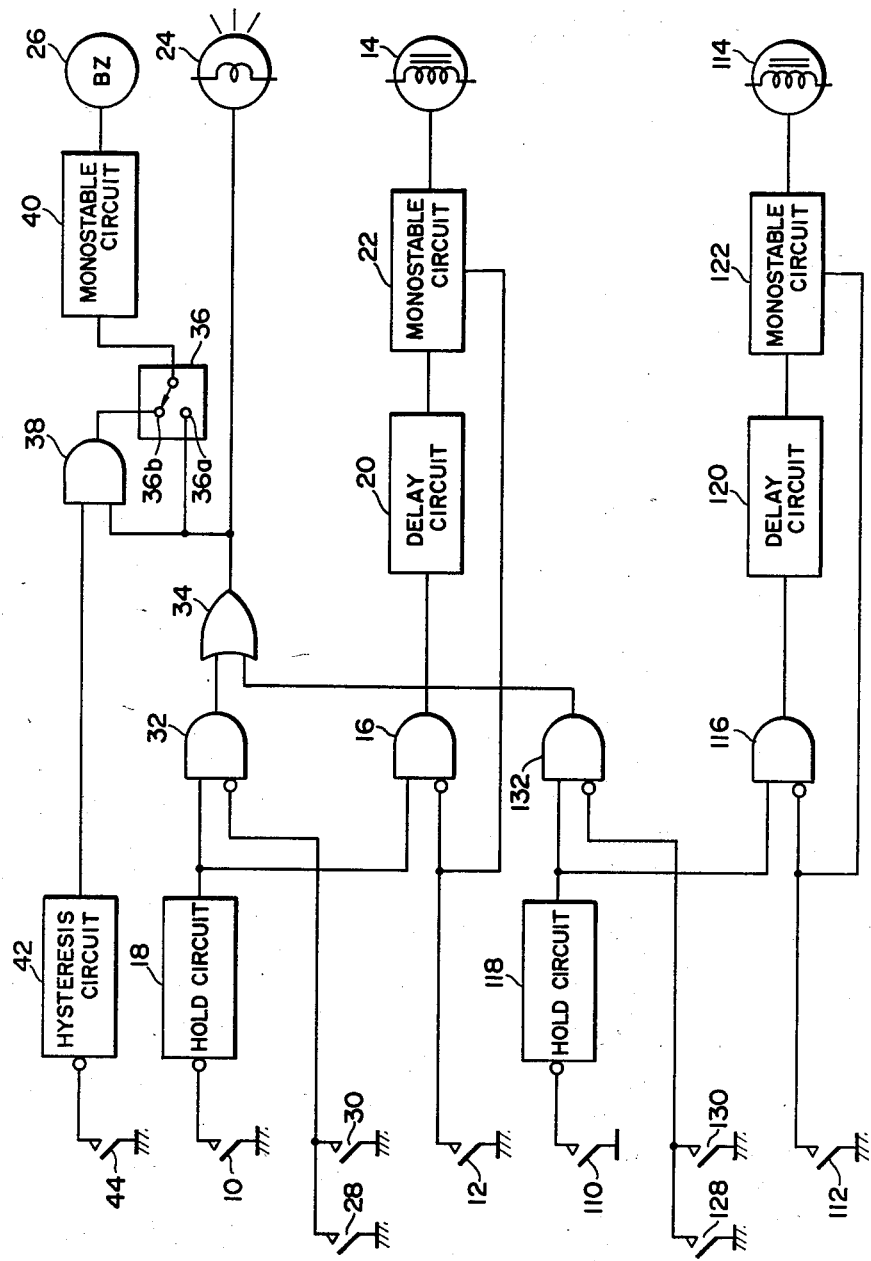

AUTOMATIC FASTENING AND ALARMING CIRCUIT FOR A VEHICLE SEAT BELT

BACKGROUND OF THE INVENTION

1. Field of the Invention

This invention concerns an automatic fastening and alarming circuit for a vehicle seat belt, and more particularly relates to an improved automatic fastening and alarming circuit for a vehicle seat belt wherein the seat belt is previously laid on a seat for fastening to a rider sitting thereon.

2. Prior Art

It is well known that the use of a seat belt can provide effective protection for the driver of a vehicle against collision or other accidents and various improvements have been proposed for seat belt devices. The driver, however, often leaves the seat belt unfastened during operation of the vehicle because of the difficulties in fastening and unfastening the seat belt, which sometimes fails to provide sufficient protection for the driver against the accident.

Improved seat belt devices capable of automatically fastening a seat belt to a driver or other riders in a vehicle have been proposed, including the well-known preferred device as disclosed in Japanese Laid-open Patent Specificationn No. 49,128/73. In the above device disclosed, a seat belt previously extends over a seat and is usually fixed to a car body at one end and to a door at the other end. The rider can sit on the seat in this state while the seat belt is retained at its intermediate portion by a latch provided in front of the seat. When the driver sits on the seat for driving the car, the seat belt is automatically released from the retention by the latch and fastened to the driver.

An object of this invention is to provide an improved automatic fastening and alarming circuit capable of automatically fastening a seat belt positively to a rider upon sitting on the seat, as well as warning him of a state where the seat belt is not fastened or is unfastened by the rider after once being fastened.

SUMMARY OF THE INVENTION

The foregoing object can be attained according to this invention including a seat switch for detecting the sitting of a rider, a door switch for detecting an opening and a closing of a door, an automatic fastening control circuit for supplying a releasing signal to an electromagnetic means which releases the retaining action of a latch means for a predetermined of time upon juding the sitting state of the rider by detection signals delivered from the seat switch and the door switch, a fastening detection switch for detecting the suitably fastened state of the seat belt to the rider and an alarming circuit for generating alarm information to the rider upon detection of the not-fastened state of the seat belt by detection signals delivered from the seat switch and the fastening detection switch.

In this invention, the alarming circuit may include such means as a lamp or a buzzer which issues the alarm information enabling the rider to easily confirm the not-fastened state of the seat belt.

Moreover, according to this invention, the alarm information can be generated corresponding to the not-fastened state of the seat belt only when a vehicle speed exceeds a predetermined value and a vehicle speed detection circuit can be provided with a hysterisis characteristic for such a warning.

The automatic mounting and alarming circuit according to this invention can be provided on the seat belts of both driver's seat and the passenger's seat of a vehicle.

BRIEF DESCRIPTION OF THE DRAWING

The accompanying drawing shows a block diagram of an automatic fastening and alarming circuit in accordance with one embodiment of this invention, provided on the seat belts of both the driver's seat and the passenger's seat.

DETAILED DESCRIPTION OF THE INVENTION

Description is to be made at first to an automatic fastening and alarming circuit provided to the seat belt on the driver's seat of a car.

To the driver's seat of the car (not shown), is provided a seat switch 10 adapted to be turned ON upon sitting of a driver in the seat. To the door on the side of the driver's seat, is provided a door switch 12 adapted to be turned ON and OFF upon closure and opening of the door. Both of the switches 10 and 12 are connected to an automatic fastening control circuit, whose output signal is supplied as a control signal to an electromagnetic means 14 including a solenoid, whereby the seat belt is released from retention by a well-known retaining means such as a latch (not shown).

The automatic fastening control circuit comprises an AND gate 16 which is supplied at one input terminal by way of a hold circuit 18 with a detection signal delivered from the seat switch 10 and, directly at the other input terminal with a detection signal delivered from the door switch 12. The hold circuit 18 is adapted to supply a sitting signal continuously to the AND gate 16 once after the seat switch 10 has been turned ON by the sitting of the driver on the seat, so that the function of the automatic fastening control circuit may not be cancelled if the driver sitting on the seat should half-rise therefrom.

Upon sitting of the driver and closure of the door, the AND gate 16 delivers its output to the delay circuit 20 which, in turn, supplies its output to the electromagnetic means 14 by way of a mono-stable circuit 22. The delay circuit 20 judges the sitting state of the driver, that is, the state where the door is closed after the driver has sat on the seat. After this condition has been satisfied, the delay circuit 20 supplies a releasing signal to the electromagnetic means 14 after the elapse of a predetermined of time, for example, one second in the illustrated embodiment.

The duration period of the releasing signal is determined by the time set for the mono-stable circuit 22, which is about 3-4 seconds in the illustrated embodiment. Accordingly, the latch can retain a state capable of retaining the seat belt after the elapse of the setting time to hold the belt easily when the driver gets out of the car.

The automatic fastening and alarming circuit in this invention has alarm means including an alarm lamp 24 and an alarm buzzer 26. When the driver sits on the seat to operate the car, these means detect if the seat belt is securely fastend and, if not, issue alarm information to him. The alarming circuit used for this purpose includes the seat switch 10 and a fastening detection switch for the detection of the correct fastening of the seat belt to the driver.

In the embodiment shown, the fastening detection switches include buckle switch 28 and a retractor switch 30. The buckle switch 28 is turned ON when a buckle attached to one end of the seat belt is detached to indicate that the seat belt is not fastened. The retractor switch 30 is turned ON when the belt is pulled out of a retractor more than required to indicate that the seat belt is not substantially fastened to the driver.

Both of the fastening detection switches 28 and 30 are connected to one of the input terminals of an AND gate 32, whose other input terminal is connected with the output of the hold circuit 18. The output of the AND gate 32 is supplied by way of an OR gate 34 directly to an alarm lamp 24, as well as to the control circuit of an alarm buzzer 26 to provide desired warning.

While the foregoing descriptions have been made in terms of the seat belt on the driver's seat, the seat belt on the passenger's seat is also provided with circuitry which is substantially the same. In the drawing, the like parts and components carry corresponding reference numerals each increased by one-hundred, but no particular description for them is repeated since their construction and function are substantially identical to those described above.

It will be apparent from the above descriptions that the alarm lamp 24 is lighted up or flickered by the output from the OR gate 34 to warn the riders of the state wherein the riders are seated on the seat and the seat belt for either one of the riders is not yet fastened correctly.

This embodiment has a further feature that an alarm buzzer operates when the seat belt is not in the fastened state. Specifically, the output from the OR gate 34 is connected by way of a manual turn-over switch 36 or AND gate 38 to a mono-stable circuit 40, whose output is further supplied to the alarm buzzer 26.

The turn-over switch 36 has turn-over contacts 36a and 36b in which the contact 36a directly connects the output of the OR gate 34 to the mono-stable circuit 40 and the other contact 36b connects the output of the OR gate 34 by way of the AND gate 38 to the mono-stable circuit 40.

Consequently, if the not-fastened state of the seat belt is detected while the switch 36 is turned to the contact 36a, the output from the OR gate 34 actuates the mono-stable circuit 40 causing it to supply an output signal to the alarm buzzer 26 for a predetermined period, i.g., 4–6 seconds, during which the alarm buzzer is caused to operate.

The other input terminal of the AND gate 38 is connected by way of a hysterisis circuit 42 with the output of a vehicle speed sensor 44. The vehicle speed sensor 44 may be a switch operationally associated with a speedometer or like other means and the output therefrom is supplied to the hysterisis circuit 42, where a desired vehicle speed is detected and an operation signal is supplied to the AND gate 38.

In the shown embodiment, the hysterisis circuit 42 supplies a signal "1" when the vehicle speed exceeds 10 Km/hr. and a signal "0" when the vehicle speed goes below 5 Km/hr. to the AND gate 38. Consequently, when the seat belt is not in the mounted state and if the vehicle speed exceeds 10 Km/hr., while the switch 36 is turned-over to the contact 36b, the AND gate 38 supplies an operational signal to the mono-stable circuit 40 to actuate the alarm buzzer 26 for 4–8 seconds.

The hysterisis circuit 42 can prevent the alarm buzzer 26 from blowing continuously if the vehicle speed fluctuates above and below the set value, 10 Km/hr.

From the foregoing, it is apparent that this invention can provide automatic fastening of the seat belt to the riders in the vehicle, as well as issue alarm information to them when the seat belt is not in the fatened state.

It should be apparent to those skilled in the art that the above described embodiment is but one of the many specific embodiments which represent the application of the principles of the present invention. Numerous and varied other arrangements can be readily devised by those skilled in the art without departing from the spirit and scope of the present invention.

I claim:

1. An automatic fastening and alarming circuit for a seat belt of a vehicle in a vehicle seat belt device having a seat belt previously extending over a seat for fastening to a rider sitting on the seat, a latch means for retaining the seat belt in a not-fastened state, electromagnetic means releasing the locking action of the latch means to unlatch the seat belt retained by the latch means, said automatic fastening and alarming circuit comprising:

a seat switch for detecting the sitting of the rider;

a hold circuit coupled to the seat switch;

a door switch for detecting the opening and closing of the doors;

a fastening, detecting switch for detecting the fastened state of the seat belt;

a vehicle speed detection circuit for detecting the speed of said vehicle and providing an output when the speed of said vehicle exceeds a predeterminned value;

a first And gate for generating a logical product of outputs of said hold circuit and said fastening detection switch;

a second And gate for generating a logical product of the outputs of said door switch and said hold circuit;

a third And gate for generating a logical product of outputs of said vehicle speed detection circuit and said first And gate;

an automatic fastening control circuit for supplying a releasing signal for a predetermined period of time to said electromagnetic means acuated by a logical product of said second And gate;

an alarm lamp actuated by said logical product from said first And gate; and an alarm buzzer acuated by said logical product of said third And gate.

2. The automatic fastening and alarming circuit for a seat belt of a vehicle as defined in claim 1, wherein the vehicle speed detection circuit includes a hysterisis circuit.

3. The automatic fastening and alarming circuit for a seat belt of a vehicle as defined in claim 1, wherein the automatic fastening and control circuit further comprises a delay circuit for supplying a releasing signal to the electromagnetic means with a predetermined time delay after the rider sits on the seat and the door is closed and a monostable circuit for setting the duration period for the releasing signal.

4. The automatic fastening and alarming circuit for a seat belt of a vehicle as defined in claim 1, wherein the fastening detection switch comprises a buckle switch adapted to turn ON upon detaching of a buckle attached to one end of the seat belt to indicate that the seat belt is not fastened and a retractor switch adapted to turn ON upon excessive pullout of the seat belt from a retractor than is required to indicate that the seat belt is not fastened to the rider.

5. The automatic fastening and alarming circuit for a seat belt as defined in claim 1, further comprising a manual turn over switch provided between said third And gate and said buzzer and further coupled to said first And gate whereby the logical output of either said first or said third And gate may be coupled to said buzzer.

6. The automatic fastening and alarming circuit for a seat belt of a vehicle as defined in claim 1, wherein the automatic fastening and alarming circuit is provided on seat belts for both a driver's seat and a passenger's seat of the vehicle.

7. The automatic fastening and alarming circuit for a seat belt of a vehicle as defined in claim 5, further comprising a time setting circuit provided between said turnover switch and said buzzer.

* * * * *